United States Patent [19]

Tsuchida et al.

[11] Patent Number: 4,723,183

[45] Date of Patent: * Feb. 2, 1988

[54] VIDEO TAPE RECORDER HAVING TAPE GUIDES SUPPORTED BY A LINEARLY MOVABLE CARRIAGE

[75] Inventors: Takefumi Tsuchida, Toyonaka; Nobuo Okada, Amagasaki; Toyozo Urakami, Kobe, all of Japan

[73] Assignee: Sanyo Electric Co., Ltd., Osaka, Japan

[*] Notice: The portion of the term of this patent subsequent to Apr. 15, 2003 has been disclaimed.

[21] Appl. No.: 3,013

[22] Filed: Jan. 13, 1987

Related U.S. Application Data

[63] Continuation of Ser. No. 774,413, Sep. 10, 1985, which is a continuation of Ser. No. 388,635, Jun. 15, 1982, Pat. No. 4,583,136.

[30] Foreign Application Priority Data

Jun. 18, 1981 [JP] Japan ................................ 56-94796

[51] Int. Cl.⁴ ............................................. G11B 15/66
[52] U.S. Cl. ........................................ 360/85; 360/95
[58] Field of Search ................................. 360/83–85, 360/90, 93–95

[56] References Cited

U.S. PATENT DOCUMENTS

| | | | |
|---|---|---|---|
| 3,770,904 | 11/1973 | Kihara | 360/85 |
| 3,940,791 | 2/1976 | Kayar et al. | 360/95 |
| 4,060,840 | 10/1977 | Umeda | 360/85 |
| 4,121,267 | 10/1978 | Hayashi | 360/95 |
| 4,191,976 | 4/1980 | Poehler | 360/85 |
| 4,309,731 | 1/1982 | Yoshida et al. | 360/85 |
| 4,410,919 | 10/1983 | Umeda | 360/85 |
| 4,583,136 | 4/1986 | Tsuchida et al. | 360/95 |

Primary Examiner—Stuart N. Hecker
Assistant Examiner—David J. Severin
Attorney, Agent, or Firm—Armstrong, Nikaido, Marmelstein & Kubovcik

[57] ABSTRACT

A video tape recorder of a type wherein a portion of the video tape exposed to the outside of a video cartridge through a cutout in the cartridge is drawn out of the cartridge and in a direction laterally of the cartridge towards a guide cylinder assembly for turning it therearound through a predetermined angle. The recorder comprises a pair of tape guides which are situated within the cutout in the cartridge when and so long as the tape is not loaded and which, when the tape is loaded, is operable to draw that portion of the video tape in said direction laterally of the cartridge and turn it around the guide cylinder assembly through the predetermined angle.

3 Claims, 14 Drawing Figures

VIDEO TAPE RECORDER HAVING TAPE GUIDES SUPPORTED BY A LINEARLY MOVABLE CARRIAGE

This is a continuation of copending application Ser. No. 774,413 filed Sept. 10, 1985, which is in turn a continuation of application Ser. No. 388,635 filled June 15, 1982, now U.S. Pat. No. 4,583,136.

BACKGROUND OF THE INVENTION

The present invention generally relates to a video tape recording and/or reproducing apparatus, or a video tape recorder, of a type utilizing a video tape cassette or cartridge.

A majority of currently commercially available video tape recorders are so designed that a video cartridge can be set in position in the recorder by horizontally inserting the video cartridge into a cartridge holder at the top of the cabinet and then allowing it to be automatically lowered to a play position. This is because it has long been considered ideal that the cartridge having a portion of the video tape exposed to the outside through a cutout area in the cartridge should, when placed at the play position, occupy a position with that exposed portion of the video tape facing a guide cylinder assembly in view of the necessity of a loading procedure in which that exposed portion of the video tape is drawn out of the cartridge and then turned through a predetermined angle around the guide cylinder assembly.

On the other hand, a majority of commercially available audio tape decks are so designed that an audio tape cassette can be set in position in the tape deck by generally vertically inserting it into a cassette holder located on the front of the cabinet and on one side laterally of control and adjustment knobs. This arrangement is advantageous in that the top of the cabinet of any of these audio tape decks is available for placement of any other articles thereon and in that the deck can be placed in a rack in which the height of a space between one shelf to another is limited. It has long been desired that even the video tape recorder can offer similar advantages.

However, where the video cartridge holder in the video tape recorder is to be arranged in a manner similar to the cassette holder in the above described audio tape deck, the loading procedure will become complicated and difficult to perform because that exposed portion of the video tape must be drawn out of the cartridge in a direction generally laterally of the cartridge prior to being turned around the guide cylinder assembly located on one side laterally of the cartridge holder.

Accordingly, the present invention has been developed to provide an improved video tape recorder of a type having a cartridge holder arranged in a manner similar to the cassette holder in the conventional audio tape deck of the above described type, wherein the loading procedure can easily and smoothly be performed.

SUMMARY OF THE INVENTION

The present invention is directed to a video tape recorder of a type wherein that exposed portion of the tape inside the video cartridge is drawn in one direction out of the cartridge through the cutout area and then pulled in a direction laterally of or perpendicular to said one direction by a pair of tape guide means so as to turn it around the guide cylinder assembly by means of a so-called M-loading method to form a generally M-shaped path for the travel of the video tape, whereby the required length of the path for the travel of the video tape can be reduced to as small a value as possible with the loading procedure simplified. In addition, since the formation of the generally M-shaped path for the travel of the video tape is effective to eliminate such a loading disc as required in the conventional video tape recorder, the overall height and width of the video tape recorder can advantageously be minimized.

It is an aspect of the present invention that, since both the path for the travel of the video tape and the stroke of movement of various guide pins can advantageously be minimized, a loading mechanism can also be simplified.

It is another aspect of the present invention that, since at the time when a plurality of tape guides located inside the cutout area in the tape cartridge operate to draw that exposed portion of the video tape out of the cartridge and then pull it in a lateral direction towards the guide cylinder assembly, these tape guides are guided along substantially the same path, the tape guides can pass through any narrow area easily and, therefore, an elevational space for the accommodation of the loading mechanism can be minimized.

It is a further aspect of the present invention that the tape guides of different length are mounted on pivotal arms which pivot about a common axle so as to expand outwardly to cause the video tape to extend generally M-shaped configuration with respect to the guide cylinder assembly, thereby substantially reducing the length of the generally M-shaped tape path.

These pivotal arms are pivotally mounted on a linearly movable carriage movable linearly in a direction laterally of the cartridge while the pivotal movement of these arms are coordinated by a suitable guide means with the linear movement of the carriage so as to guide the tape guides along their predetermined paths, and therefore, the loading procedure can be performed in a limited available space.

It is a still further aspect of the present invention that the linear movement of the carriage with the pivotal arms pivotally mounted thereon is effective to cause the video tape to be guided along a predetermined path to form the generally M-shaped tape path by means of the tape guides mounted on the pivotal arms, thereby simplifying the loading mechanism.

It is a still further aspect of the present invention that, when and so long as the video tape is not loaded, the tape guides are arranged generally in line with each other within the cutout area in the cartridge and, when the video tape is loaded, the tape guides move out of the cutout area in the cartridge and are guided by the guide means along substantially the same path in a direction laterally of the cartridge. Therefore, during the formation of the M-shaped tape path, the tape guides can be passed through any narrow area and, therefore, the elevational space for the accommodation of the loading mechanism can be minimized.

It is a still further aspect of the present invention that there is provided guide rails for regulating the positions of the tape guides from both directions for accurately guiding them during the turning of the video tape around the guide cylinder assembly without permitting them to jolt during their movement. It is to be noted that these guide rail may be of one-piece construction made by molding a synthetic resinous material, and can, therefore, be formed easily in a simple construction.

It is a still further aspect of the present invention that there is employed a first guide means for drawing the tape guides out of the cutout area in the cartridge, a second guide means for guiding the tape guides in the direction laterally of the cartridge subsequent thereto, and a third guide means for guiding them to predetermined positions, the employment of these guide means being effective to reduce the length of the path for the travel of the video tape and also to simplify the loading mechanism.

It is a still further aspect of the present invention that, since a retainer for locking the tape guide has an abutment for restricting the stroke of angular movement of a pivotal member having an impedance roller mounted thereon, and since the position of the pivotal member at which it is engaged with the abutment can be determined merely by positioning the retainer, the relative positioning of the retainer and the impedance roller can readily and easily be performed.

In addition, since the use of separate stoppers is not required, the number of the component parts can advantageously be minimized.

So far as this is involved, the concept of the present invention can equally be applicable to any other video tape recorder of the type wherein the cylinder assembly is located frontwardly of the cartridge.

It is a still further aspect of the present invention that, since the guide block is slidably mounted on the pivotal arm so that, by the action of a spring resulting from the over-stroke or extra stroke of the pivotal arm relative to the retainer the guide block is urged to contact the retainer and, at the same time, the guide block is biased towards the retainer by a biasing means composed of a pair of elastic tongues spaced a predetermined angle from each other to make it possible for the guide block to be firmly locked in position in engagement with the retainer, the positioning of the tape guide relative to the guide cylinder assembly can readily and accurately be performed.

It is a still further aspect of the present invention that, since the drawing of that portion of the video tape out of the cartridge and the formation of the predetermined path for the travel of the video tape are carried out by angularly moving the first pivotal arm with the first tape guide thereon to engage with the second pivotal arm and then angularly moving the second pivotal arm with the second tape guide, no extra drive means is required to drive the second pivotal arm when the second tape guide is to be moved out of the cutout area in the cartridge and, therefore, the loading mechanism for the formation of the predetermined tape path can advantageously be simplified.

It is a yet further aspect of the present invention that, since one side portion of the guide rail for guiding the tape guide is partly ground out so that, during the passage through the partly ground side portion of the guide rail, a guide flange member can be urged to slidingly contact the other side portion of the guide rail by the action of a leaf spring on the carriage, the tape guide can be guided across and through any extremely narrow area and, therefore, the overall dimensions of the video tape recorder can advantageously be minimized.

It is a yet further aspect of the present invention that a tensioning mechanism for applying a predetermined tension to the video tape is constituted by a tensioning lever adapted to be pivoted by a rack-and-pinion arrangement and having an engagement piece loosely engaged in a slot which is defined in the pinion gear so that the tensioning lever can pivot through a predetermined distance defined by the length of the slot, any abnormal variation in tension of the video tape being then transported would not result in the angular movement of the tensioning lever beyond the predetermined distance and, therefore, a tension detecting pin would not excessively shift in position.

In addition, the operating position of the tension detecting pin can easily be adjusted by adjusting the position of a stopper for regulating the stroke of movement of the rack. Therefore, the video tape can advantageously be transported steadily.

BRIEF DESCRIPTION OF THE DRAWINGS

These and other object and features of the present invention will become apparent from the following detailed description taken in conjunction with a preferred embodiment thereof with reference to the accompanying drawings in which:

FIG. 3b is a side elevational view of the recorder shown in FIG. 3a.

Before the description of the present invention proceeds, it is to be noted that like parts are designated by like reference numerals throughout the accompanying drawings.

DETAILED DESCRIPTION

Figures 1A, 2:
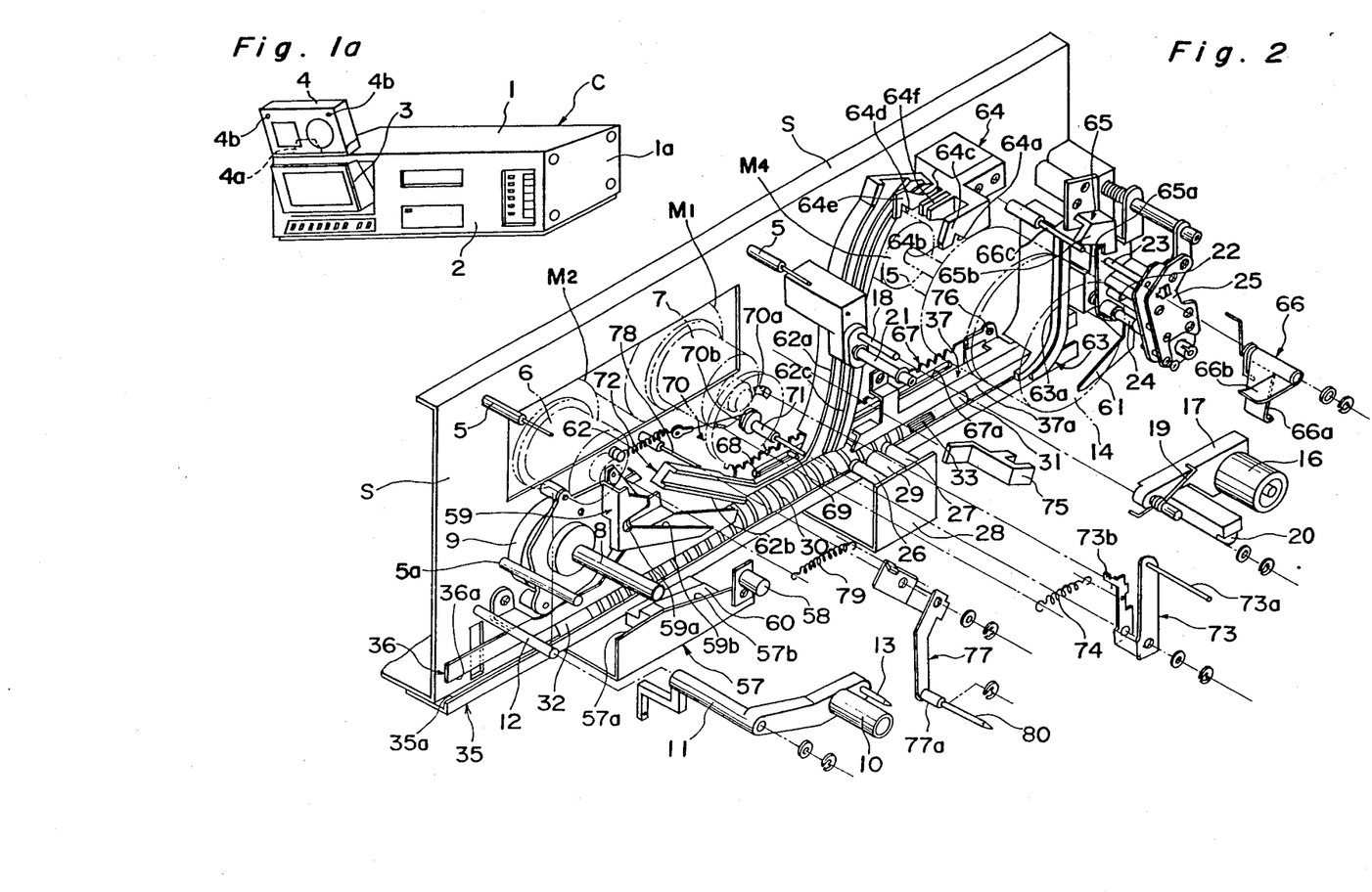
FIG. 1a is a schematic perspective view of a video tape recorder according to the present invention.
FIG. 2 is an exploded view of an essential portion of the recorder shown in FIG. 1.

Referring first to FIG. 1a there is shown a video tape recording and/or reproducing apparatus or, briefly speaking, a video tape recorder of a type operable with a video tape cassette or cartridge. The video tape recorder shown therein comprises a generally rectangular box-like cabinet C fabricated with top and bottom panels, a pair of opposite side panels, and front and rear panels, the top panel, the front panel and one of the side panels being identified respectively by 1, 2 and 1a, it being to be understood that the relative terms "front" and "rear" herein used are in relation to the direction as viewed by the user or operator of the video tape recorder while the latter takes a definite placement on any suitable support, for example, a table, a shelf or a television receiver set. The height of the cabinet C corresponding to the space between the bottom and top panels is represented by the width of the rectangular front panel 2 of which longitudinal sense lies horizontally.

The front panel 2 has a cartridge holder 3 provided thereat adjacent to one side of the cabinet C or one end of the front panel 2. This cartridge holder 3 is supported in any known manner for pivotal movement between opened and closed positions with the axis of pivot extending horizontally along and adjacent a lower edge thereof and, when in the opened position as shown, receives the video tape cartridge 4 which has been inserted thereinto from top. When in the closed position, the cartridge holder 3 has its outer surface held generally in flush with the front panel 2.

Figures 1B, 4:
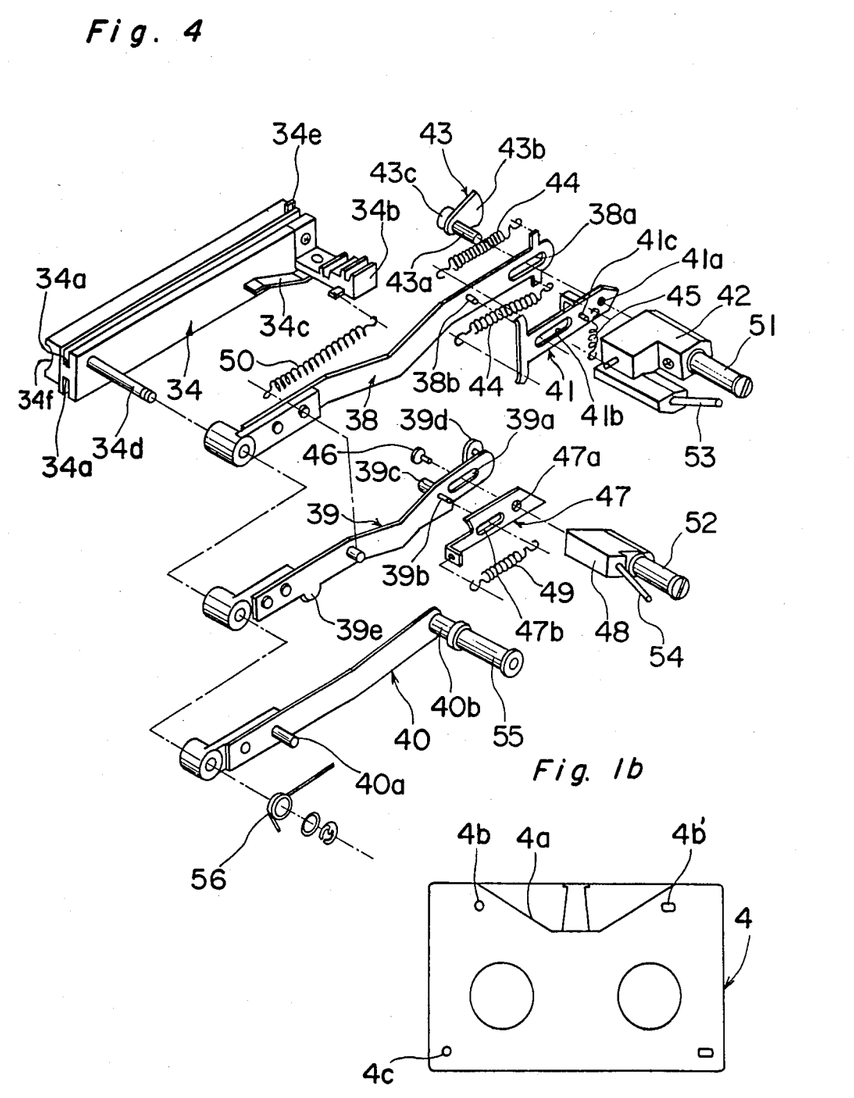
FIG. 1b is a schematic top plan view of a video tape cartridge utilizeable in the present invention.
FIG. 4 is an exploded view, on an enlarged scale, showing a carriage used in the recorder.

As is well known to those skilled in the art, the cartridge 4 is of a generally rectangular configuration having supply and take-up reels with a magnetic video tape extending therebetween and also having a cutout from which a portion of the tape within the cartridge 4 is drawn out of the cartridge 4 and onto a cylinder or drum assembly during the recording or reproducing operation of the apparatus. This cutout is defined along one of the opposite longer sides of the cartridge and at a portion substantially intermediately between the opposite shorter sides of the cartridge 4.

In accordance with the present invention, the cartridge holder 3 is so shaped and so positioned as to receive therein the cartridge 4 which has been inserted thereinto from top with the cutout oriented downwards. In other words, when to place into the cartridge holder 3, one must hold the cartridge 4 with the cutout oriented downwards and then insert it into the cartridge holder 3 before the latter is pivoted from the opened position towards the closed position by the application of an external finger pressure.

The front panel 2 has control and adjustment knobs and function meters all disposed laterally of the cartridge holder 3, i.e., at the right-hand portion of the front panel as viewed in FIG. 1, the purpose of the provision of these knobs and meters being well known to those skilled in the art.

The video tape recorder outlined above with reference to FIG. 1 includes a mechanism for loading and unloading the magnetic video tape one at a time, which will now be described with reference to FIGS. 2 to 6.

Figure 3A:
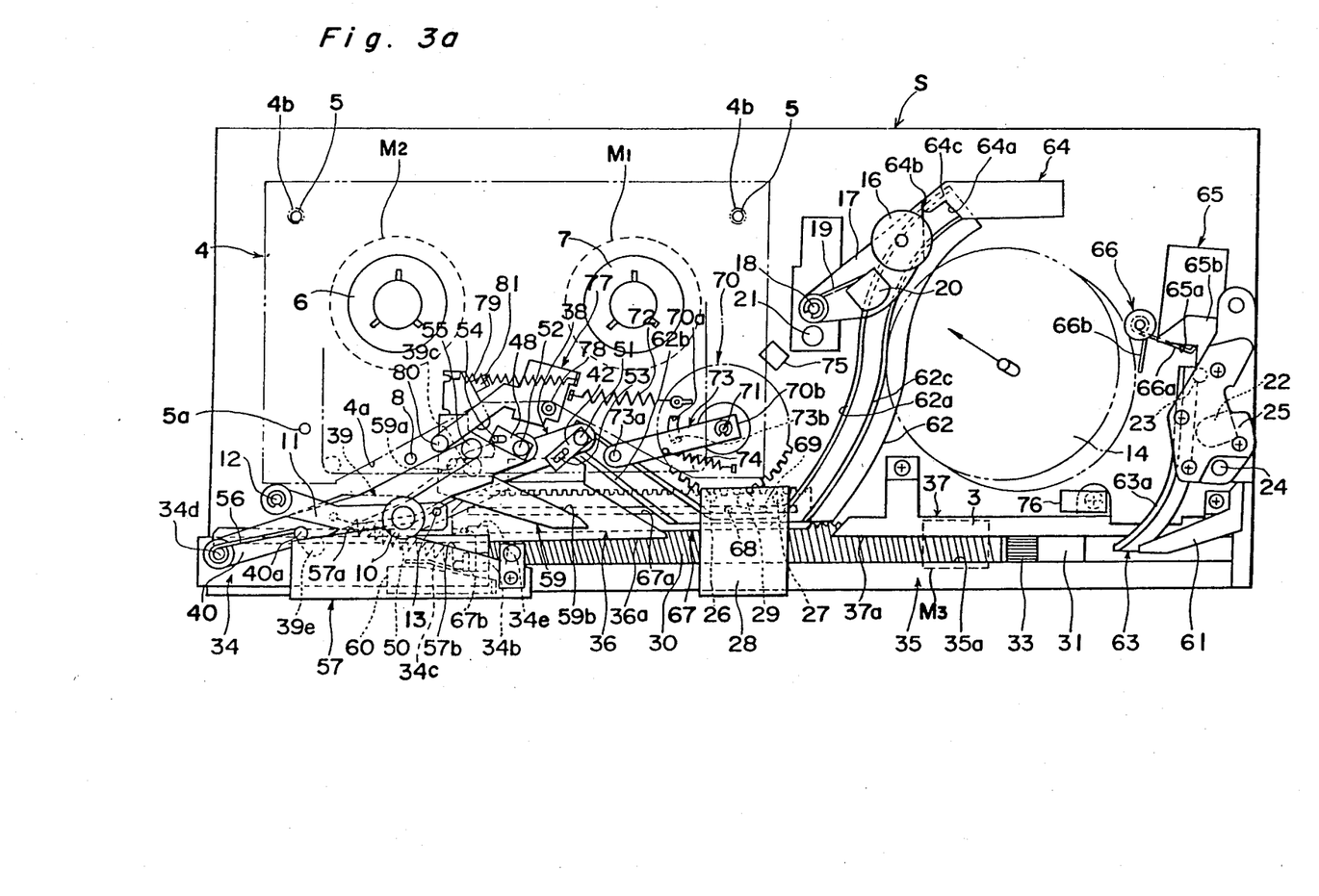
FIG. 3a is a front elevational view with various movable parts of the recorder shown in unloading condition.
Figure 3B:
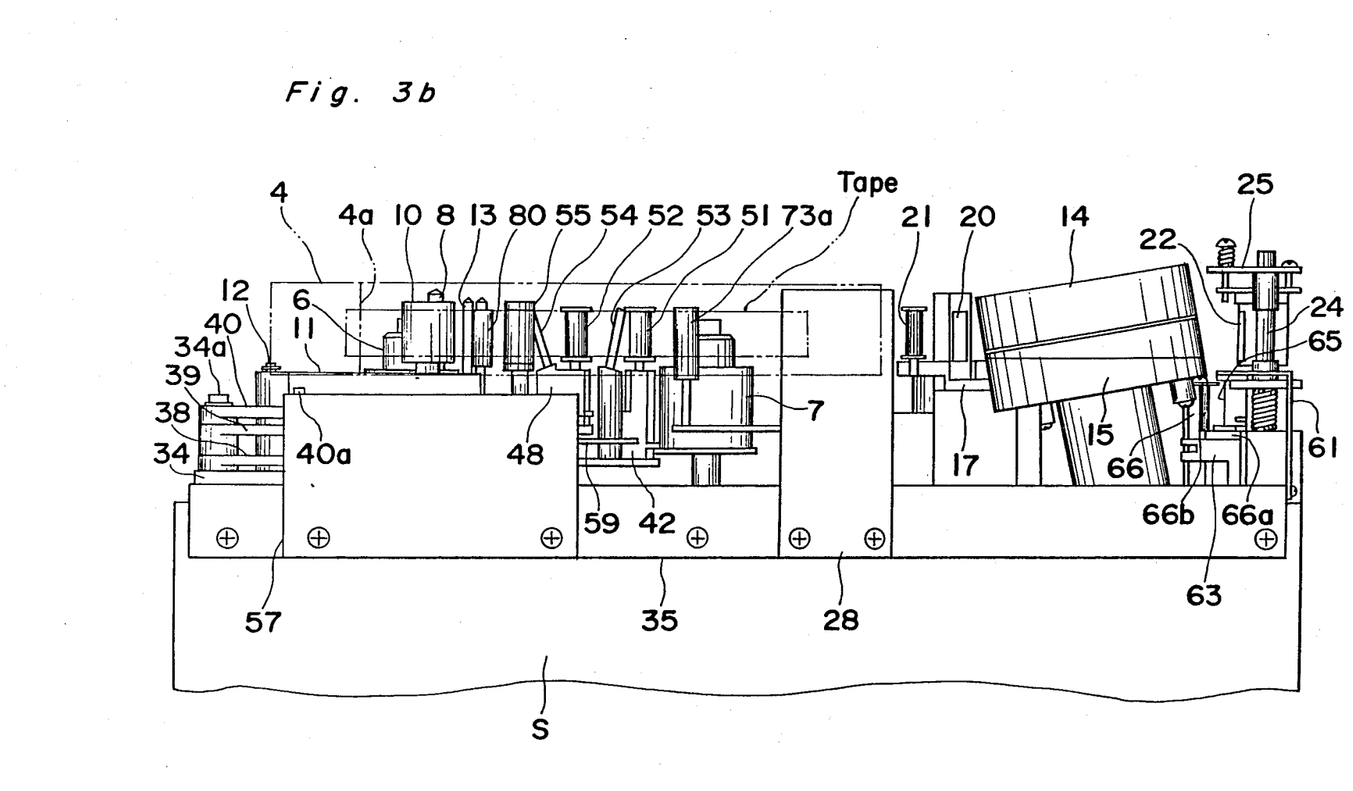

Referring first to FIGS. 2 and 3, the loading and unloading mechanism comprises an upright chassis S of generally rectangular configuration positioned within the cabinet C rearwardly of the front panel 2. This chassis S has a pair of positioning pins 5 protruding therefrom towards the interior of the cartridge holder 3 for engagement into corresponding positioning holes 4b spaced apart in the cartridge 4 as shown in FIG. 1a. These positioning pins 5 protrude into the respective positioning holes 4b in the cartridge 4, when the cartridge holder 4 with the cartridge 3 therein is pivoted to the closed position, to firmly hold the cartridge 4 in position in cooperation with known abutment pins (not shown) engageable with one surface of the cartrige for avoiding any possible rattling motion of the cartridge within the cartridge holder 3.

The upright chassis S carries such various operating components of the video tape recorder as take-up and supply reel supports 6 and 7 engageable respectively with the take-up and supply reels in the cartridge 4; a capstan 8 which, when the cartridge holder 3 with the cartridge 4 therein is in the closed position, protrudes into the cutout 4a in the cartridge 4; a capstan drive motor 9 operatively coupled to the capstan 8 through any known drive transmission system for driving the capstan 8 in both directions; and a support shaft 12 on which a pinch roller support lever 11 carrying a pinch roller 10 is mounted for pivotal movement between an engaged position, in which the pinch roller 10 is engaged to the capstan 8 with that portion of the video tape sandwiched therebetween for transporting the video tape from the supply reel onto the take-up reel and also from the take-up reel onto the supply reel during the rotation of the capstan 8, and a disengaged position in which the pinch roller 10 is separated from the capstan 8, said support lever 11 also carrying a guide pin 13 operable to avoid any possible undesirable entanglement of the video tape being passed through a nipping area between the capstan 8 and the pinch roller 10.

The guide cylinder assembly around which that portion of the video tape drawn out of the cartridge 4 is turned through about 180° for engagement with a magnetic recording and/or reproducing head assembly rotatable within the guide cylinder assembly by a known driving mechanism, as will be described in detail later, is mounted on the upright chassis S on one lateral side of the cartridge holder 3 with its longitudinal sense extending towards the front panel 2 and tilted a predetermined angle in a direction generally diagonally upwardly of the chassis S as shown by the arrow in FIG. 3. This guide cylinder assembly comprises upper or rotary and lower or fixed guide cylinders 14 and 15 one behind the other in a direction perpendicular to the chassis S and has a circular head path which is defined between the front and rear cylinders 14 and 15 and from which the magnetic recording and/or reproducing head assembly is exposed to the outside of the guide cylinder assembly for engagement with the video tape then transported therearound as is well known to those skilled in the art. Considering the fact that, in any conventioanl video tape recorder of helical scan type, the video tape must, when to be transported around the guide cylinder assembly, extend at a predetermined angle relative to the plane of rotation of the magnetic recording and/or reproducing head assembly, those skilled in the art can readily understood the purpose for which the cylinder assembly comprised of the upper and lower guide cylinders 14 and 15 is tilted relative to the chassis S as hereinbefore described.

Positioned adjacent to and diagonally upward from the guide cylinder assembly is an impedance roller 16 for applying a tension to the video tape to stabilize the latter during the movement thereof. This impedance roller 16 is rotatably carried by a pivotable support lever 17 mounted on a shaft 18 fast with the chassis S for pivotal movement between operative and inoperative positions, the support lever 17 being, however, normally biased clockwise about the shaft 18, as viewed in FIG. 3, to assume the operative position by the action of a torsion spring 19. The support lever 17 has a magnetic erasing head 20 rigidly mounted thereon which head 20 when operated serves to erase any recorded information on the video tape, and also has a fixed guide post 21 rigidly mounted thereon adjacent the erasing head 20.

On one side of the guide cylinder assembly opposite to the support lever 17, a magnetic recording and/or reproducing head 22 for recording or reproducing voice information and control signals on the video tape and a pair of spaced guide posts 23 and 24 on respective sides of the head 22 are carried by a support block 25 which is in turn secured to the chassis S.

The chassis S has a generally L-shaped bracket 28 rigidly secured thereto and, as best shown in FIG. 2, protruding frontwardly from a substantially intermediate portion of a lower side edge of the chassis S. This bracket 28 carries a pair of spaced guide posts 26 and 27 protruding therefrom towards the upright chassis S, and also a tape end sensor 29 positioned between the guide posts 26 ahd 27, said tape end sensor 29 comprising a sensor coil housed within a cylindrical body or casing and being operable to detect, and generate an electrical signal indicative of, the end of the video tape when the latter has completely been transported from the supply reel onto the take-up reel within the cartridge 4.

The loading and unloading mechanism in the embodiment of the present invention is featured in that all of the functions of drawing that portion of the video tape out of the cartridge 4 in a direction laterally of the cartridge 4 within the cartridge holder 3 in the closed position, turning that portion of the video tape the predetermined angle, for example, about 180°, around the guide cylinder assembly, and releasing the video tape to allow the latter to be withdrawn into the cartridge 4 are performed by a linear reciprocal movement of a carriage having first, second and third arms pivotally mounted thereon. A linear drive mechanism for reciprocately moving the carriage in a direction lengthwisely of the chassis 8 along the lower side edge thereof will first be described with reference to FIGS. 2 to 6.

Referring particularly to FIGS. 2 to 4, the linear drive mechanism comprises a screw shaft 30 extending horizontally along the lower side edge of the chassis S and journalled at its opposite ends by bearings 31 and 32 fast with the chassis S. This screw shaft 30 is driven about its own longitudinal axis by means of a drive motor (not shown) carried by the chassis S and having its drive shaft coupled to a gear 33 which is rigidly mounted on, or otherwise integrally formed with, one end of the screw shaft 30 adjacent the bearing 31. The carriage is generally identified by 34 and is in the form of an elongated body of generally rectangular cross section. As best shown in FIG. 4, the carriage 34 has a pair of separate grooves 34a, extending lengthwise of the carriage 34 along the respective opposite sides thereof, and also a helically toothed groove 34f of generally semicircular cross-section engageable with the screw shaft 30 in drivingly meshed relation to said screw shaft 30. The carriage 34 has a stay 34b rigidly mounted on, or otherwise formed integrally with, the carriage 34 so as to protrude at right angles thereto in a direction opposite to the helically toothed groove 34f, and also a leaf spring 34c extending laterally of the stay 34b, the function of each of said stay 34b and said leaf spring 34c being described later.

The carriage 34 is supported for movement along the screw shaft 30, with the helically toothed groove 34f drivingly meshed with the periphery of the the screw shaft 30, by the chassis 5 through generally plate-shaped rails 35, 36 and 37 secured to the chassis S. The rail 35 is of a length sufficient to extend generally over the entire length of the chassis S and has a support edge 35a engaged in a lower groove 34a in the carriage 34 for supporting the latter from below, whereas the rails 36 and 37 have respective support edge 36a and 37a each engageable in the upper groove 34a in the carriage 34 for supporting the latter from above, it being to be noted that the rails 36 and 37 are secured to the chassis S in axially aligned, but spaced relation to each other with the space therebetween being so sized as to be smaller than the length of the carriage 34.

From the foregoing description, it is clear that, during the rotation of the screw shaft 30 in one direction, the carriage 34 can move from an inoperative position towards an operated position along the screw shaft 30, the rotation of the screw shaft 30 in the opposite direction, however, resulting in the reverse movement of the carriage 34 from the operated position back towards the initial, inoperative position.

As best shown in FIG. 3, the carriage 34 carries the first, second and third pivotal arms generally identified by 38, 39 and 40, respectively. These arms 38, 39 and 40 are pivotally mounted at one end on a support shaft 34d, secured to and protruding from the carriage 34 on one side opposite to the helically toothed groove 34f, in overlapping relation to each other, the arms 38 and 40 positioned closest and remotest to the carriage 34, respectively.

The first arm 38 is formed at its other end portion with a slot 38a and a projection 38b and carries a first slide plate 41 and a first guide block 42. The first slide plate 41 has a bearing hole 41a and a slot 41b both defined therein and is formed with a projection 41c. The first arm 38 also carries a first guide flange member 43 positioned on one side thereof opposite to the first slide plate 41 which is, as will be described latter, positioned between the arm 38 and the first guide block 42. The first flange member 43 is comprised of a generally sector-shaped flange 43b, a pin member 43a having one end rigidly secured to a substantially apex portion of the flange 43b and a guide projection 43c formed with, or otherwise rigidly secured to the flange 43b on one side opposite to the pin member 43a. These elements 38, 41, 42 and 43 are assembled together with the pin member 43a extending through the slot 38a in the arm 38 and then through the bearing hole 41a in the slide plate 41 and finally tapped into the guide block 42. In this assembled condition, the projection 38b on the arm 38 protrudes into the slot 41b in the slide plate 41. The slide plate 41 so mounted between the arm 38 and the guide block 42 is normally biased by a pair of tension springs 44 in a direction axially exterior to the arm 38 with the pin member 43a and the projection 38b consequently engaged to one ends of the respective slots 38a and 41b. The first guide block 42 is pivotable relative to the slide plate 41 about the longitudinal axis of the pin member 43a but only through a predetermined angle which is defined by an arcuate cutout (not shown), defined on one surface of the block 42 facing the slide plate 41, in cooperation with the projection 41c engaged in such cutout. In addition, the first guide block 42 is normally biased by a spring 45 to a first position wherein the block 42 is so engaged to the projection 41c that the first pivotal arm 38, the first slide plate 41 and the first guide block 42 can be integral with each other.

The first guide block 42 has a first guide pin 51 and a first inclined guide pin 53 both rigidly mounted thereon so as to extend outwardly therefrom in a direction away from the arm 38, the function of each of which will be described later.

The second pivotal arm 39 is similar in construction to the above described first pivotal arm 38, but has a length smaller than it. Specifically, as best shown in FIG. 4, this second pivotal arm 39 is formed at the other end portion with a slot 39a and a projection 39b and carries a second slide plate 47 and a second guide block 48. The second slide plate 47 is formed with a bearing hole 47a and a slot 47b and is positioned movably between the arm 39 and the guide block 48 with a set screw 46 passing through the slot 39a and then the bearing hole 47a and finally tapped into the guide block 48 while the projection 39b is accommodated within the slot 47b. The second pivotal arm 39 also has an engagement pin 39c and a second guide flange 39d, which protrude from the arm 39 in a direction opposite to the second guide block 48 and are located on respective sides of the slot 39a, and a lateral protrusion 39e integrally formed with a substantially intermediate portion of the arm 39. Tension springs 49 and 50 are respectively suspended between the arm 39 and the slide plate 47 and between the arm 39 and the carriage 34 and, accordingly, in a normal condition, the arm 39, the slide plate 47 and the guide block 48 are integral with each other and are engaged to the first pivotal arm 38.

In a manner similar to the guide block 42 on the first pivotal arm 38, the second guide block 48 also has a second guide pin 52 and a second inclined guide pin 54 both rigidly mounted thereon so as to extend outwardly therefrom in a direction away from the arm 39. It is to be noted that these guide pins 51, 52, 53 and 54 form respective parts of means for defining the path of movement of the video tape as will become clear from the subsequent description.

The third pivotal arm 40 is simple in construction as compared with the first and second pivotal arms 38 and 39 and has a length smaller than any one of them. This arm 40 is formed at the other end portion with a third guide pin 55, forming another part of the tape path defining means, with a roller 40b positioned between the arm and the guide pin 55 in coaxial relation with the latter and is also formed at a substantially intermediate portion thereof with an engagement pin 40a, a torsion spring 56 being disposed between said engagement pin 40a and the support shaft 34d on the carriage 34.

Hereinafter, a guiding mechanism for guiding the first to third pivotal arms 38, 39 and 40 from an unloading position to a loading position will be described with reference to FIGS. 2 and 3.

As shown in FIGS. 2 and 3, the guiding mechanism comprises first, second, third and fourth guide plates 57, 59, 60 and 61 and first and second grooved guide rails 62 and 63, all rigidly carried by the chassis S. Specifically, the first guide plate 57 is of a generally L-shaped configuration having one side edge, rigidly secured to the lower edge of the chassis S, and the other side edge formed with first and second cam edges 57a and 57b continued to each other. These cam edges 57a and 57b are so positioned as to support the third pivotal arm 40 from below in contact with the engagement pin 40a and are so shaped as to guide the third guide pin 55 out of the cutout 4a in the cartridge 4 and into a predetermined path as the carriage 34 moves from the inoperative position towards the operated position. The first guide plate 57 has a tape end sensor 58 mounted thereon so as to protrude frontwardly, said sensor 58 being operable to detect the end of the video tape when the latter has completely been rewound from the take-up reel to the supply reel in the cartridge 4.

The second guide plate 59 is secured to the chassis S through a capstan bearing plate and is formed with a detent recess 59a and a third cam edge 59b continued to the detent recess 59a. The detent recess 59a and the third cam edge 59b are so positioned and so shaped as to receive the engagement pin 39c on the second pivotal arm 39 and also as to guide the second guide block 48 out of the cutout 4a in the cartridge 4 and into a predetermined path as the carriage 34 moves from the inoperative position towards the operated position.

The third guide plate 60 is rigidly mounted on a horizontally lying portion of the L-shaped first guide plate 57 and is so shaped and so operated as to guide the second pivotal arm 39 continuously along the predetermined path in sliding contact with the lateral projection 39e in the arm 39 after the engagement pin 39c on the arm has disengaged from the second guide plate 59.

The fourth guide plate 61 is rigidly mounted on the fixed guide post 24 on the head support block 25 and is so positioned and so shaped as to engage with the roller 40b on the third pivotal arm 40 shortly before the completion of the loading and then guide the arm 40 to an end-of-the-loading position.

The first grooved guide rail 62 extends generally in the shape of a figure "V" for guiding the first pivotal arm 38 from an unloading position to an end-of-the-loading position and is comprised of an inner wall 62a extending continuously between the unloading and end-of-the-loading positions for the first pivotal arm 38, a first outer wall 62b spaced from the inner wall 62a and extending from the unloading position to a substantially intermediate position which corresponds in position to the bottom of the figure "V" of the shape of the first grooved guide rail 62, and a second outer wall 62c spaced from the inner wall 62a and extending from said intermediate position to the end-of-the-loading position for the arm 38, said first and second outer walls 62b and 62c being spaced from each other at said intermediate position. This guide rail 62 is so designed and so shaped that, during the movement of the first pivotal arm 38 from the unloading position to the intermediate position, the walls 62a and 62b cooperate with each other to control the movement of the guide protrusion 43c on the first flange member 43 in a direction parallel to the plane of the chassis S whereas, during the movement through a predetermined distance from the intermediate position, the guide protrusion 43c is so controlled in position as to contact the inner wall 62a under pressure by the action of the leaf spring 34c on the carriage 34. Starting from a position spaced the predetermined distance from the above described intermediate position and up until the end-of-the-loading position, the second outer wall 62c is operable to hold the sector-shaped flange 43b of the first flange member 43 slidingly between it and the inner wall 62a for controlling the movement of said flange 43b in a direction generally perpendicular to a chassis and, at the same time, the inner wall 62a and a portion of the second outer wall 62c cooperate with each other to control in position the guide protrusion 43c in a direction parallel to the plane of the chassis.

The second guide rail 63 operable to guide the second pivotal arm 39 from a position shortly before the end-of-the-loading position to the end-of-the-loading position is formed by a guide groove 62a extending therein and guiding the second flange member 39d on the second pivotal arm 39 so that the position and movement of second pivotal arm 39 can be controlled.

The loading and unloading mechanism also comprises first and second retainers for locking the first and second pivotal arms 38 and 39 at the end-of-the-loading positions, respectively, and a tape tensioning mechanism. In the first place, the first and second retainers will be described with particular reference to FIGS. 2, 5 and 6.

Figure 5:
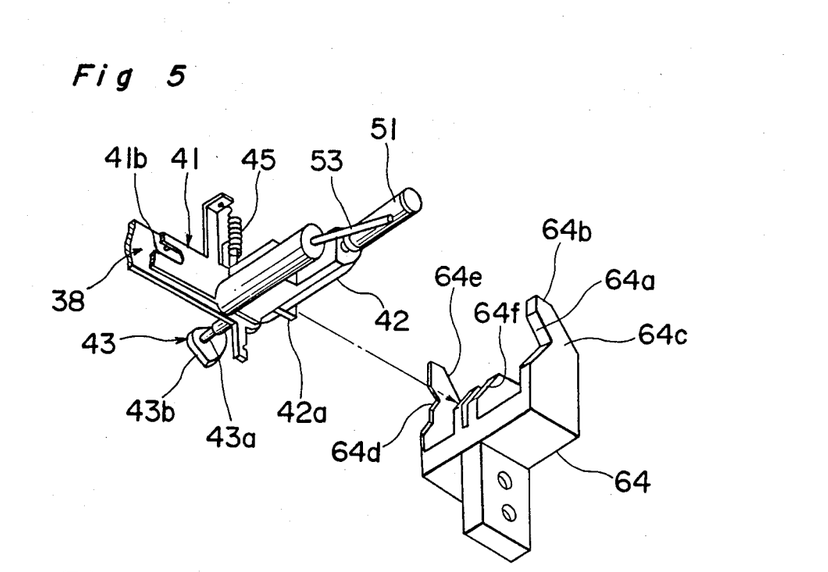
FIG. 5 is a perspective view showing the relative position of a guide block on a first pivotal arm relative to a first arm.

The first retainer is generally identified by 64 and is positioned adjacent one end of the first grooved guide rail 62 substantially above the guide cylinder assembly for engagement with the first guide block 42 on the first pivotal arm 38 to lock the latter at the end-of-the-loading position. This first retainer 64 is, as best shown in FIG. 5, of one-piece construction formed with a first fixing finger 64c, which has defined therein a generally V-shaped notch 64a engageable with one side edge of the first guide block 42 and an abutment 64b engageable with one end of the pivotable support lever 17 for controlling the pivotal movement of said lever 17, a second fixing finger 64e, which has defined therein a notch 64d for receiving therein the engagement pin 43a on the first flange member 43, and nipping fingers 64f for holding therebetween a lateral projection 42a fast or integral with the first guide block 42 on the first pivotal arm 38.

Figure 6:
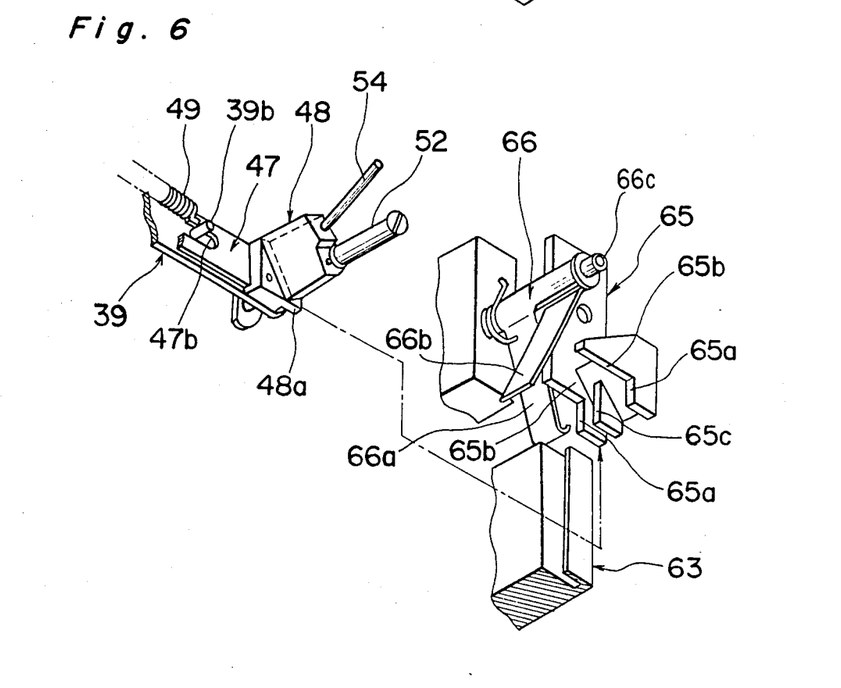
FIG. 6 is a view similar to FIG. 5, showing the relative position of a guide block on a second pivotal arm.

The second retainer is generally identified by 65 and is positioned adjacent an upper end of the second guide rail 63 for engagement with the second guide block 48 on the second pivotal arm 39 to lock the latter at the end-of-the-loading position. As best shown in FIG. 6, the second retainer 65 is comprised of a pair of spaced fixing pieces 65b, each having defined therein a generally V-shaped notch 65a for engagement with one side of the second guide block 48, and a nipping finger 65c cooperable with one of the fixing pieces 65b to hold therebetween a lateral projection 48a fast or integral with the second guide block 48. Disposed adjacent the second retainer 65 is a leaf spring assembly 66 of a configuration similar to the shape of a figure "α" mounted rotatably on a support shaft 66c. This spring assembly 66 has a pair of tongues 66a and 66b extending radially outward from the support shaft 66c and spaced a predetermined angle from each other about the longitudinal axis of the support shaft 66c. This leaf spring assembly 66 is normally biased by a torsion spring in a counterclockwise direction with the first tongue 66a consequently held in position projecting outwardly from the notches 65a.

The tape tensioning mechanism will now be described with reference to FIGS. 2 and 3. This tensioning mechanism comprises a rack 67 having an axially extending slot 67a and is movably supported by the chassis S by means of a support pin 68 for movement in a direction parallel to the screw shaft 30. This rack 67 has an engagement piece 67b provided at a left-hand end of the rack 67 and engageble with a projection 34e fast with the carriage 34. Cooperable with this rack 67 is a pinion gear 70 rotatably mounted on a shaft 71 and meshed thereto, said pinion gear 70 having an arcuate slot 70a defined therein. The pinion gear 70 has a coaxial pulley 70b formed integrally therewith and is normally biased counterclockwise about the shaft 71 by the action of a tension spring 72 suspended between it and the chassis S and, accordingly, the rack 67 is also normally biased in a right-hand direction. The tensioning mechanism also comprises a tensioning lever 73 of generally U-shaped configuration pivotally mounted on the shaft 71 on one side of the pinion gear 70 opposite to the chassis S and having a tensioning pin 73a protruding frontwardly from one end thereof remote from the shaft 71. This tensioning lever 73 also has a bent piece 73b bent to protrude towards the chassis S and loosely engaged in the arcuate slot 70a in the pinion gear 70, and is normally biased couterclockwise about the shaft 71 by the action of a tension spring 74 suspended between the lever 73 and the pinion gear 70.

For detecting the position of the tensioning lever 73 about the shaft 71, a photoelectrical position detector 75 is employed. This detector 75 comprises any known photocoupler and is so designed as to generate an output signal indicative of the intensity of light sensed thereby, said sensed light intensity being variable with the position of the tensioning lever 73. The output signal from the position detector 75 is used to control the drive motor (not shown) for driving the supply reel support 7 in dependence on the sensed light intensity for the purpose of applying an adequate tension to the video tape by means of the tensioning pin 73a in a manner as will be described later. It is to be noted that reference numeral 76 represents a stopper secured to the chassis S for defining a right-hand position for the movement of the rack 67.

The tape path defining means referred to hereinbefore also includes, in addition to the elements hereinbefore described, a pivotal lever 77 pivotally supported by the chassis S by means of a shaft 78 and normally biased counterclockwise about the shaft 78 by the action of a spring 79. This pivotal lever 77 carries a fourth guide pin 80 mounted on the free end portion of the lever 77 with a roller 77a coaxially positioned between it and the guide pin 80 for sliding engagement with a lateral side of the third pivotal arm 40. The counterclockwise rotation of this pivotal lever 77 biased by the spring 79 is restricted by a stopper 81 secured to the chassis S. Motors $M_1$ to $M_4$ are provides to adapt to drive the above respective mechanism in a known manner.

While the loading and unloading mechanism is constructed as hereinbefore described, the operation thereof will now be described with reference to FIGS. 3 and 7 to 11.

When and so long as the cartridge 4 is mounted i.e., during the unloading condition, as shown in FIG. 3, the carriage 34 is held at the inoperative position. At this time, the first pivotal arm 38 is held at a starting point of the first grooved guide rail 62 adjacent the second guide plate 59, the second pivotal arm 39 is held in position with the engagement pin 39c engaged in the notch 59a in the guide plate 59, and the third pivotal arm 40 is held in position with the engagement pin 40a in contact with one of the opposite extremities of the first cam edge 57a opposite to the second cam edge 57b. In addition, the pivotal lever 77 is held in position with the roller 77a engaged to the lateral side of the third pivotal arm 40 adjacent the free end thereof, and the tensioning lever 73 is pivoted clockwise about the shaft 77 by the reason that the rack 67 is held at the left-hand position as shown.

In view of the above, all of the capstan 8, the first and second guide blocks 42 and 48, the third guide pin 55, the tensioning pin 73a and the fourth guide pin 80 project into the cutout 4a in the cartridge in a row, while the pinch roller support lever 11 is held in abutment with the first guide plate 57, having been pivoted couterclockwise about the support shaft 12 and, consequently, the pinch roller 10 on the lever 11 is spaced from the capstan 8.

Assuming that a cartridge detection switch (not shown) is subsequently closed, the drive motor (not shown) is driven to rotate the screw shaft 30 in one direction, thereby moving the carriage 34 from the inoperative position towards the operated position along the rails 35, 36 and 37 with the first to third pivotal arms 38, 39 and 40 consequently pivoted in the following manner. At the same time, the upper or rotary guide cylinder 14 of the guide cylinder assembly is driven in a counterclockwise direction about the longitudinal axis of said guide cylinder assembly.

Figure 7:
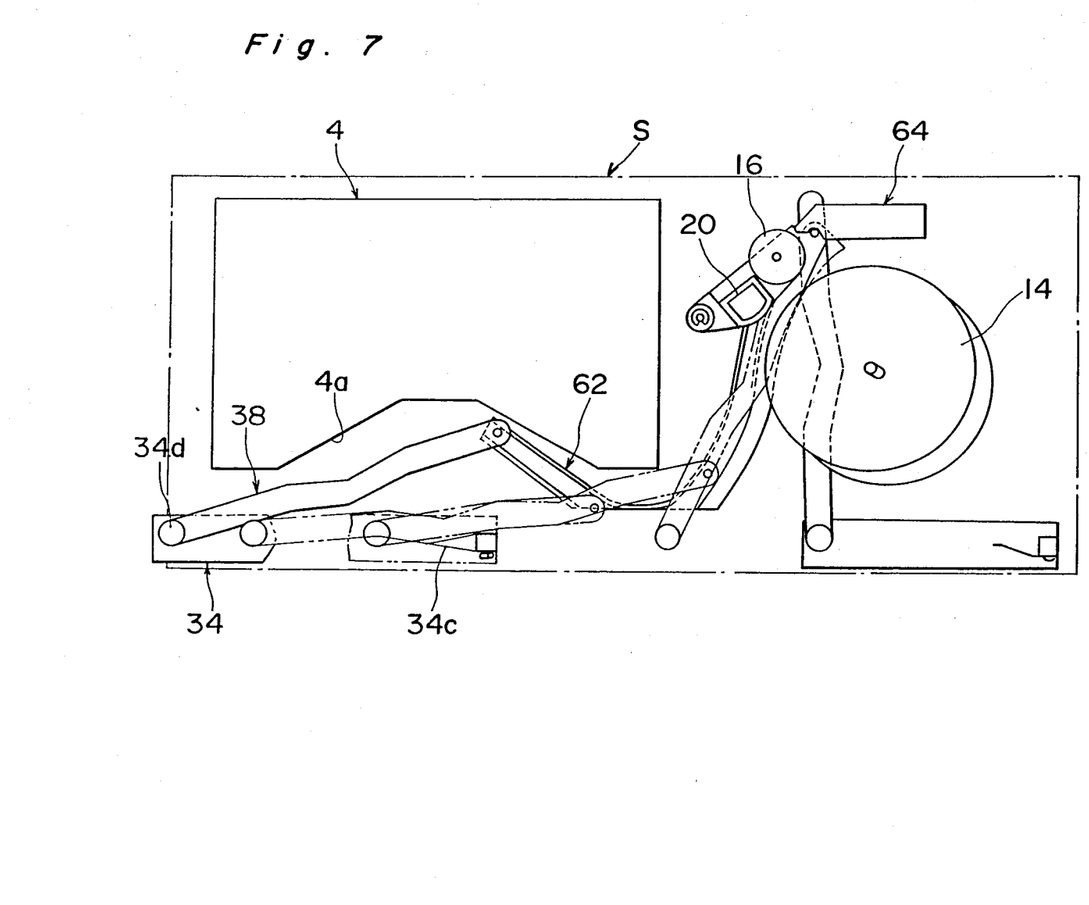
FIG. 7 is an explanatory diagram showing the movement of the first pivotal arm incident to the movement of the carriage from an inoperative position toward an operated position.

As the carriage 34 moves from the inoperative position towards the operated position, as best shown in FIG. 7, the first pivotal arm 38 pivots clockwise about the shaft 34d through a predetermined angle with its free end guided diagonally downward, as viewed in FIG. 7, along the first grooved guide rail 62 and, accordingly, the first guide block 42 separates away from the cutout 4a in the cartridge 4 with the first guide pin 53 drawing out of the cartridge 4 a portion of the video tape traversing across the cutout 4a of the cartridge 4. After the first pivotal arm 38 has been pivoted through the predetermined angle with its free end arriving at the substantially intermediate portion of the guide rail 62 which corresponds in position to the bottom of the figure "V", the arm 38 contacts the leaf spring 34c on the carriage 34 and is, therefore, upwardly urged by the spring 34c to contact the inner wall 62a of the guide rail 62 under pressure, the guide block 42 on the arm 38 being consequently guided to pass through a narrow space between the intermediate guide pins 26 and 27. Thereafter, during the continued movement of the carriage 34 towards the operated position with the first flange member 43 guided between the inner and outer walls 62a and 62c of the first grooved guide rail 62, the arm 38 pivots counterclockwise about the shaft 34 with its free end moving upwards through a space between the chassis S and the rear or fixed guide cylinder 15, and the first guide block 42 on the arm 38 is subsequently engaged in the notch 64a in the first retainer 64. Shortly before the arrival at the end-of-the-loading position, although the free end of the arm 38 tends to move further upwardly, accompanied by the continued movement of the carriage 34 towards the operated position, the first slide plate 41 on the arm 38 is forced to slide axially inwardly of the arm 38 together with the first guide block 42 and, accordingly, no change in position occur in the guide block 42. When the drive to the drive motor (not shown) is interrupted by a detection switch (not shown) at the time of or in response to the arrival of the carriage 34 at the operated position, the carriage 34 is brought to a halt and the first pivotal arm 38 is also brought to a halt having a predetermined extra stroke relative to the first retainer 64. Thus, at the time of the arrival of the carriage 34 at the operated position, the first guide block 42 is held in position in control with the first retainer by the action of the springs 44.

Figure 8:
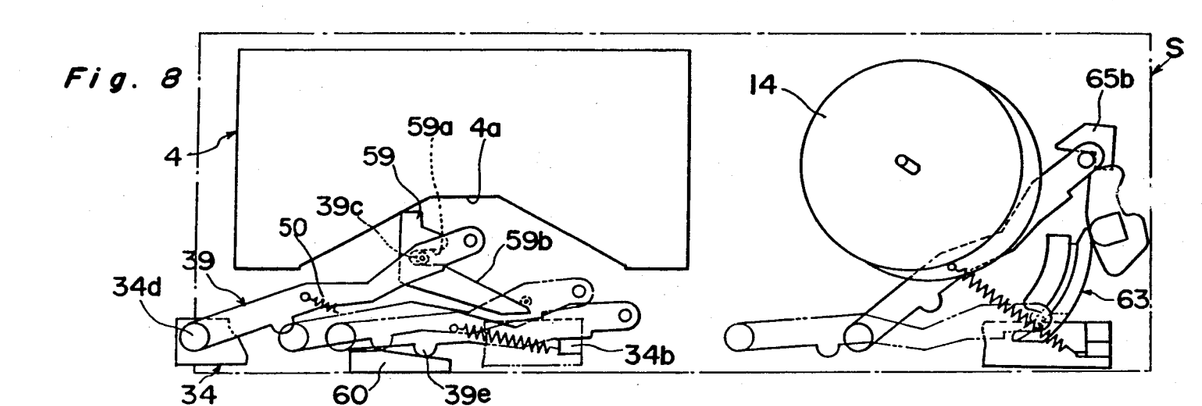
FIG. 8 is a diagram similar to FIG. 6, showing the movement of the second pivotal arm during the movement of the carriage from the inoperative position towards the operated position.
Figure 9:
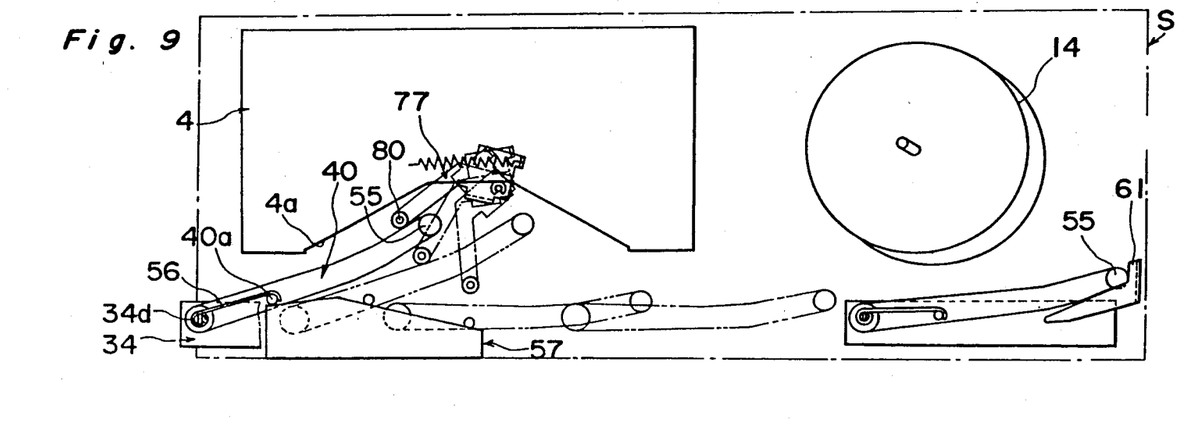
FIG. 9 is a diagram similar to FIG. 6, showing the movement of a third pivotal arm during the movement of the carriage from the inoperative position towards the operated position.

While the first pivotal arm 38 moves in the above described manner, the second and third pivotal arms 39 and 40 move in respective manner as best shown in FIGS. 8 and 9.

As shown in FIG. 8, as the carriage 34 moves from the inoperative position in the manner as hereinbefore described, the second pivotal arm 39 pivots clockwise about the shaft 34d by the action of the tension spring 50 with the engagement pin 39c thereon disengaging from the detent recess 59a in the second guide plate 59 and then sliding on the cam edge 59b, the second guide block 48 on the arm 39 consequently separating away from the cutout 4a in the cartridge 4 with the second guide pin 52 drawing that portion of the video tape out of the cartridge 4 in cooperation with the first guide pin 51. Simultaneously with the subsequent disengagement of the engagement pin 39c from the cam edge 59b in the second guide plate 59 the lateral protrusion 39e of the arm 39 is brought into contact with the third guide plate 60 and, thereafter, the second guide block 48 descends towards a narrow area by the effect of the continued linear movement. When and after the lateral protrusion 39e has disengaged from the third guide plate 60, the arm 39 is engaged to the stay 34b on the carriage 34 and moves together with the carriage 34 in a rightward direction with the second guide block 48 depicting the trace of movement which is generally parallel to the direction of movement of the carriage 34. During this movement, the first and second pivotal arms 38 and 39 expand relative to each other, having pivoted about the same shaft 34d on the carriage 34. As the carriage 34 approaches the operated position, the second pivotal arm 39 is caused to pivot counterclockwise about the shaft 34d with its free end deflected in contact with the second guide rail 63 so as to move generally upwards along the guide rail 63 towards the second retainer 65. At this time, a generally intermediate portion of the arm 39 moves into the space between the chassis S and the lower or fixed guide cylinder 15. Shortly before the second guide block 48 on the arm 39 is engaged to the second retainer 65, the tongue 66a of the torsion spring assembly 66 best shown in FIG. 6 is pressed by the second guide block 48 with the spring assembly 66 consequently pivoted counterclockwise about the shaft 66c. When the second guide block 48 is subsequently engaged in the notches 65a in the second retainer 65 the tongue 66b of the spring assembly 66 so pivoted counterclockwise as hereinabove described serves to press the second guide block 48 into the notches 65a. Upon the arrival of the carriage 34 at the operated position, the arm 39 is brought to a halt, having a predetermined extra stroke relative to the second retainer 65. Thus, at the time of the arrival of the carriage 34 at the operated position, the second guide block 48 on the arm 39 is urged to the second retainer 65 by the action of the spring 49.

It is to be noted that, although the extra stroke for the second pivotal arm 39 is somewhat smaller than that for the first pivotal arm 38 and, therefore, the contact pressure is small, the torsion spring assembly 66 serves to give a sufficient contact pressure necessary to lock the second guide block 48 in position.

From the foregoing, it will readily be understood that the relative expanding motion of the first and second pivotal arms 38 and 39 is effective to turn that portion of the video tape, drawn out of the cartridge 4, around the guide cylinder assembly through the predetermined angle, for example, about 180°. However, since the engagement between the arm 38 and the first retainer 64 has been made to take place earlier than the engagement between the arm 39 and the second retainer 65, that portion of the video tape can be turned around the guide cylinder assembly gradually from one side adjacent the first guide block 42 to the other side adjacent the second guide block 48 in the same direction as the direction of rotation of the front or rotary guide cylinder 14. Therefore, that portion of the video tape can smoothly be turned around the guide cylinder by the relative expanding motion of the first and second pivotal arms 38 and 39.

Figure 10:
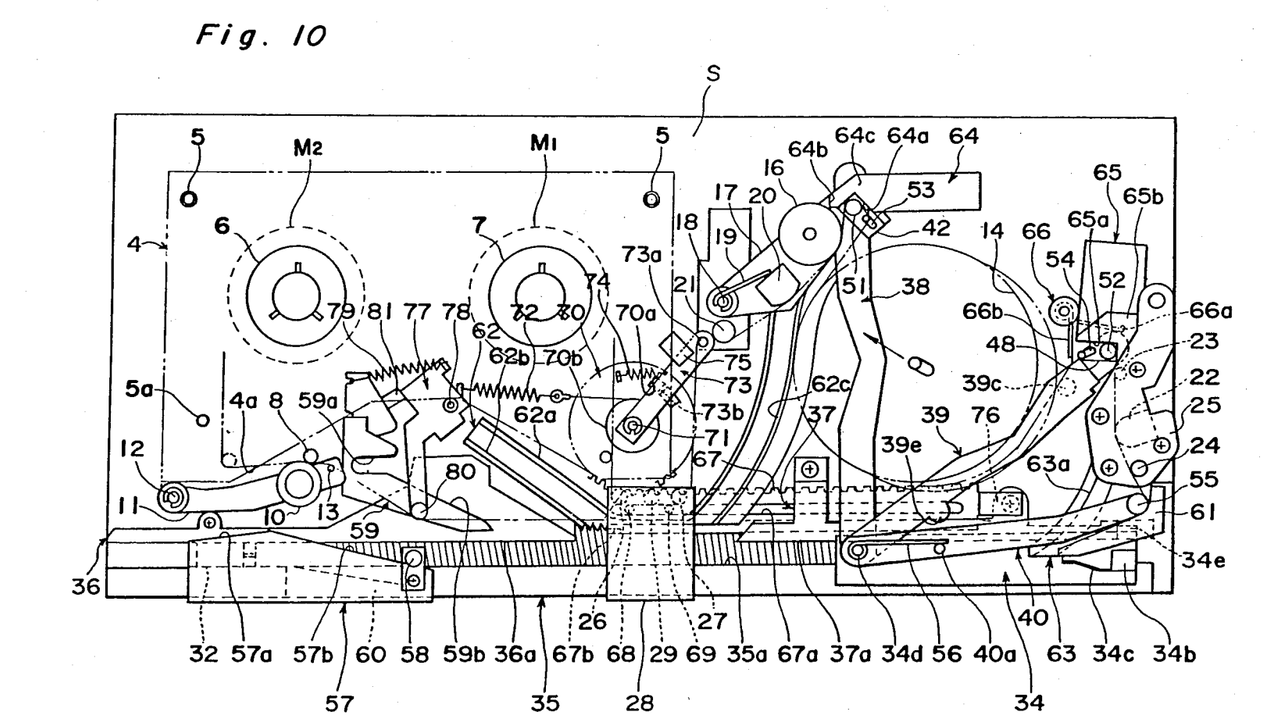
FIG. 10 is a view similar to FIG. 3, showing the movable parts in loading condition.
Figure 11:
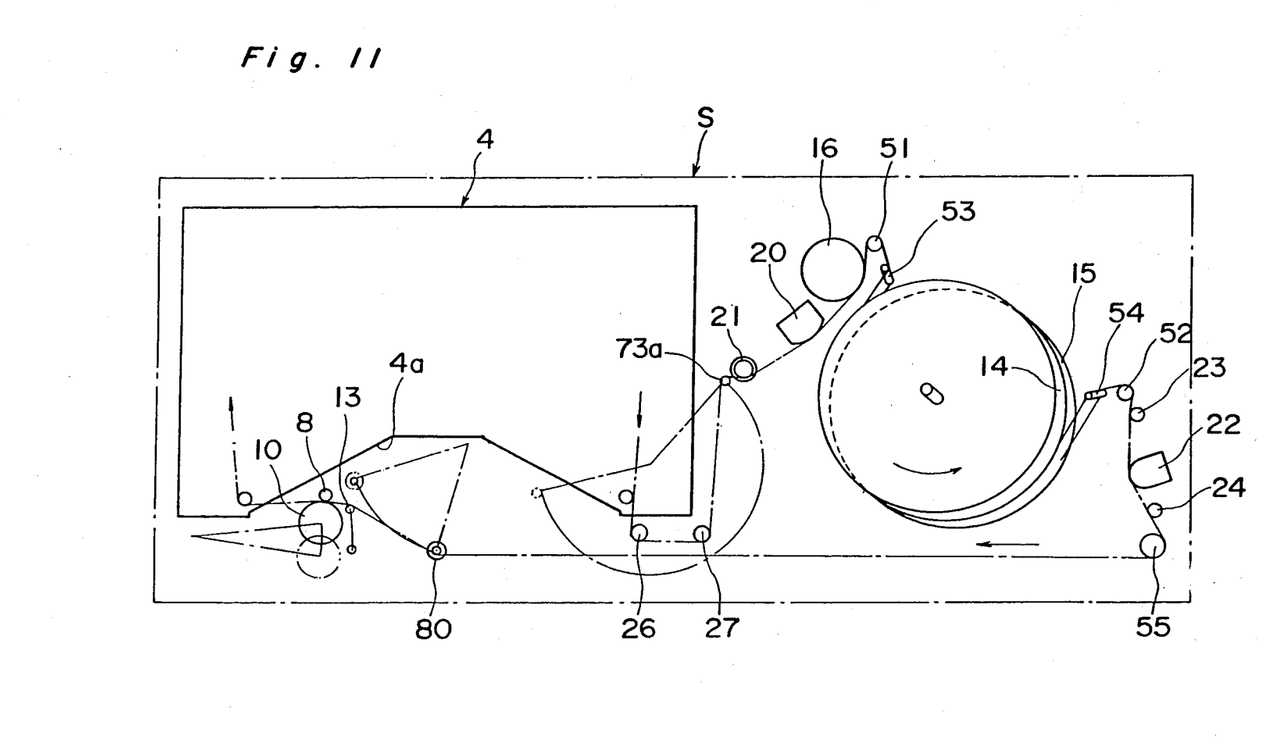
FIG. 11 is a schematic front elevational view showing the path of travel of a video tape drawn out of a video cartridge.

Referring now to FIG. 9, the third pivotal arm 40 urged clockwise about the shaft 34d by the torsion spring 56 with the engagement pin 40a resting on the first guide plate 57 is, as the carriage 34 moves from the inoperative position towards the operated position, pivoted further clockwise while the pin 40a is guided along the first cam edge 57a and then the second cam edge 57b. During this pivotal movement of the arm 40, the third guide pin 55 on the arm 40 draws that portion of the video tape out of the cartridge 4 in a manner similar to the first and second guide pins 51 and 52, depicting a trace of movement generally similar to that of the first and second guide blocks 42 and 48. Subsequent to the disengagement of the engagement pin 40a from the guide plate 57, the arm 40 biased by the torsion spring 56 with its free end portion engaged to the stay 34b on the carriage 34 in a manner similar to the second pivotal arm 39 moves rightwards together with the carriage 34 being moved towards the operated position. As soon as the roller 40b on the arm 40 engages the fourth guide plate 61, the arm 40 is pivoted a certain angle in a couterclockwise direction against the spring 56 with the roller 40b guided upwardly by the guide plate 61, thereby separating away from the second pivotal arm 39 as can readily be understood from the comparison of FIG. 9 with FIG. 8 and as shown in FIG. 10. At the time of the arrival of the carriage 34 at the operated position, the arm 40 is locked in position with the roller 40b resting on the guide plate under pressure as biased by the torsion spring 56. Therefore, as shown in FIG. 11, another portion of the video tape extending between the guide pin 52 and the guide pin 55 is urged to contact the magnetic head 22 and also the guide posts 23 and 24 on respective sides of the magnetic head 22.

In addition, incident to the movement of the carriage 34 as shown in FIG. 10, since the rack 67 is permitted to slide rightwards, the pinion gear 70 biased by the spring 72 is rotated couterclockwise to cause the rack 67 to slide rightwards. As a result thereof, the tensioning lever 73 biased couterclockwise pivots in the same direction. Accordingly, the tensioning pin 73a on the tensioning lever 73 draws that portion of the video tape out of the cartridge 4 through the cutout 4a in advance of the first and second guide block 42 and 48 and also of the third guide pin 55 and subsequently causes that portion of the video tape to be turned around the intermediate guide pins 26 ahd 27 after having passed through the previously described narrow area as shown in FIG. 11. Further, when the rack 67 being in a sliding motion subsequently abuts the stopper 76, the engagement thereof with the carriage 34 is released. Thereafter, the tensioning pin 73a is engaged to the position detector 75 and moves about the shaft 71 through the predetermined angle determined by the arcuate slot 70a in the pinion gear 70, in which the bent piece 73b is loosely engaged, thereby to detect the tension of the video tape.

Although the fourth guide pin 80 on the pivotal lever 77 is situated within the cutout 4a in the cartridge 4 in view of the fact that the roller 77a on the same lever 77 is engaged to the lateral side of the third pivotal arm 40 by the action of the spring 79, the pivotal lever 77 pivots with the roller 77a guided by and in contact with the lateral side of the pivotal arm 40 during the pivotal movement of the arm 40, with the fourth guide pin 80 consequently drawing that portion of the video tape out of the cartridge 4 through the cutout 4a. After the roller 77a has subsequently disengaged from the lateral side of the third pivotal arm 40 the pivotal lever 77 is brought into engagement with the stopper 81 and held in position in contact therewith.

Shortly before the completion of the loading, the pinch roller support lever 11 is pivoted counterclockwise about the shaft 12 by the actuator (not shown) with the pinch roller 10 consequently pressed against the capstan 8 with the video tape sandwiched therebetween.

At the time the loading has completed in the manner as hereinbefore described, as best shown in FIG. 10, the first pivotal arm 38 extends generally vertically having passed across the space between the chassis S and the rear or fixed guide cylinder 15, the third pivotal arm 40 extends generally horizontally and generally in parallel relation to the screw shaft 30, and the second pivotal arm 39 extends diagonally upwards and generally intermediately between the first and third pivotal arms 38 and 40. The shaft 34d about which all of the first to third pivotal arms 38 to 40 are pivotable is located at a position below the guide cylinder assembly and on one side of the longitudinal axis of the guide cylinder assembly adjacent the cartridge 4 or the pinion gear 70, such that the intermediate or center point of the length of the video tape turned around the guide cylinder assembly is positioned on one side adjacent the cartridge 4 or the pinion gear 70 with respect to the imaginary line drawn across the longitudinal axis of the guide cylinder assembly at right angles to the screw shaft 30. Thus, it will readily be seen that that portion of the video tape drawn out of the cartridge 4 through the cutout 4a in the manner as hereinbefore described extends in a manner as best shown in FIG. 11. Specifically, that portion of the video tape drawn out of the cartridge 4 extends from the supply reel back to the take-up reel having first deflected about 180° by the intermediate guide posts 26 and 27 so as to extend backwardly and on one side laterally exteriorly of the cartridge 4, turned around the tensioning pin 73a so as to contact sequentially the erasing head 20 and the impedance roller 16, again turned around the guide pin 51 and then the inclined guide pin 53 so as to encircle the guide cylinder assembly, further turned around the inclined guide pin 54 and then the guide pin 52 so as to deflect backwards to contact the head 22 and subsequently around the guide pin 55 so as to extend generally in parallel to the screw shaft 30 and finally through the nipping area between the capstan 8 and the pinch roller 10 after having been deflected in contact with the guide pin 80.

It is to be noted that, since the impedance roller support lever 17 is engaged to the abutment 64b of the first retainer 64, it does not contact the guide cylinder assembly. It is also to be noted the guide pins 53 and 54 respectively on the first and second guide blocks 42 and 48 are so inclined that a portion of the video tape turned about 180° around the guide cylinder assembly can extend at the predetermined angle relative to the plane of rotation of the rotary head assembly within the guide cylinder assembly as can be readily understood by those skilled in the art and as is the case with the conventional video tape recorder of helical scan type. Further, as shown in FIG. 11, the intermediate point of the portion of video tape which is turned around the guide cylinder assembly is spaced a smaller distance from the cartridge than the distance between the cartridge and the longitudinal axis of the guide cylinder assembly.

Figure 12:
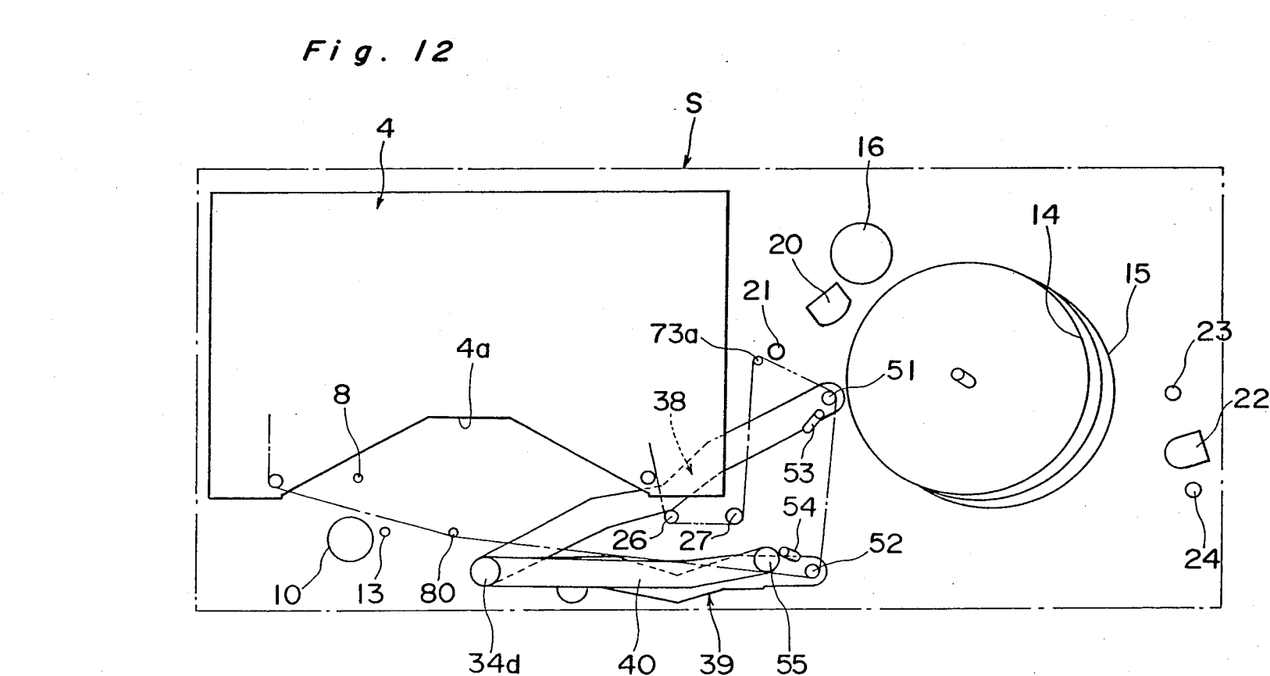
FIG. 12 is a view similar to FIG. 11, showing the path assumed by the video tape during a rapid rewinding or rapid advance mode.

Thus, when a recording or reproducing manipulation is performed during the loading condition, the capstan 8, the take-up reel support 6 and the supply reel support 7 are both driven in one respective direction with the tape consequently transferred and the rotary head assembly within the guide cylinder assembly records or reproduces information on the video tape. However, if a rapid advance or rapid rewind manipulation is performed, the drive motor (not shown) is driven in the reverse, or opposite, direction and the carriage 34 is moved back from the operated position to such a position shown in FIG. 11, i.e., the position sufficient to allow that portion of the video tape, which has been turned around the guide cylinder assembly, to separate therefrom, whereby the rapid advance or the rapid rewinding of the video tape takes place with the path of travel of the video tape having been shortened as shown in FIG. 12. When the recording or reproducing manipulation is again performed, the previously described loading condition is resumed.

When an unloading manipulation is performed starting from the loading condition, that portion of the video tape drawn out of the cartridge 4 can be retracted into the cartridge 4 with the various movable elements operating in a manner reverse to that hereinbefore described.

Although the present invention has fully been described in connection with the preferred embodiment thereof with reference to the accompanying drawings, it is to be noted that various changes and modification are apparent to those skilled in the art. By way of example, although in the foregoing embodiment the turning of the video tape around the guide cylinder assembly has been described as performed by the first and second pivotal arms carrying the respective guide pins, the drive of the various tape guides may be effected by the use of wires or chains while they may be guided by a suitable guiding means.

In addition, the first guide rail has been described as shaped so as to control the position of the guide block in one direction during the movement from the starting position to the intermediate position and as to control it in both direction during the movement from the intermediate position to the end-of-the-loading position. This is because during the latter movement a highly accurate positioning in a direction perpendicular to the chassis is required for that portion of the video tape to be turned around the guide cylinder assembly whereas, during the former movement, the highly accurate positioning in the direction perpendicular to the chassis is not required so much. However, the portion of the first guide rail in which the former movement takes place may be shaped as to control it in both direction to effect a highly accurate guidance of the guide block.

An impedance roller similar to the impedance roller referred to hereinbefore may be positioned adjacent the second guide block and, in such case, the video tape can highly be stabilized during its movement.

Yet, a pressure applying member similar in function to the generally α-shaped torsion spring assembly for the second guide block may also be employed for the first guide block to enable the latter to be firmly locked in position in engagement with the first retainer.

Accordingly, such changes and modification as are to be understood as included within the turn scope of the present invention unless they depart therefrom.

What is claimed is:

1. A video tape recorder of a type wherein a portion of a video tape exposed to the outside of a video cartridge through a cutout in the cartridge is drawn out of the cartridge and in a lengthwise direction with respect to the cartridge towards a guide cylinder assembly, which is spaced from a side of said cartridge in the lengthwise direction thereof, for turning it therearound through a predetermined angle, which comprises a pair of tape guide means which are situated within the cutout in the cartridge when the tape is not loaded and which, when the tape is loaded, is operable to draw at least said portion of the video tape in said lengthwise direction with respect to the cartridge and turn it around the guide cylinder assembly through the predetermined angle, and carriage means movable linearly, generally parallel to said lengthwise direction for supporting the tape guide means.

2. A video tape recorder as set forth in claim 1, wherein an intermediate point of the length of the portion of the video tape which is turned around the guide cylinder assembly is spaced a smaller distance from the cartridge than the distance between the cartridge and the longitudinal axis of the guide cylinder assembly.

3. A video tape recorder of a type wherein a portion of the video tape exposed to the outside of a video cartridge through a cutout in the cartridge is drawn out of the cartridge and in a lengthwise direction with respect to the cartridge towards a guide cylinder assembly, which is spaced from a side of said cartridge in the lengthwise direction thereof, for turning it therearound through a predetermined angle, which comprises a guiding means for, when the video tape is not loaded, positioning a plurality of tape guides within the cutout in the cartridge in line with each other, said guiding means being, when the video tape is loaded, operable for guiding at least some of the tape guides along the same path so as to draw at least said portion of the video tape out of the cartridge and also to guide it in said lengthwise direction with respect to the cartridge and turn it around said guide cylinder assembly through said predetermined angle, and carriage means movable linearly, generally parallel to said lengthwise direction for supporting at least some of the tape guides.

* * * * *